United States Patent
Selph

(10) Patent No.: US 9,736,097 B2
(45) Date of Patent: *Aug. 15, 2017

(54) COMPRESSION OF MESSAGE INFORMATION TRANSMITTED OVER A NETWORK

(71) Applicant: TIBCO SOFTWARE INC., Palo Alto, CA (US)

(72) Inventor: Russell Selph, Palo Alto, CA (US)

(73) Assignee: TIBCO Software Inc., Palo Alto, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 14/702,500

(22) Filed: May 1, 2015

(65) Prior Publication Data
US 2015/0236994 A1 Aug. 20, 2015

Related U.S. Application Data

(63) Continuation of application No. 13/298,234, filed on Nov. 16, 2011, now Pat. No. 9,049,162.

(60) Provisional application No. 61/414,321, filed on Nov. 16, 2010.

(51) Int. Cl.
*G06F 15/16* (2006.01)
*H04L 12/58* (2006.01)
*G06F 17/30* (2006.01)

(52) U.S. Cl.
CPC ...... *H04L 51/066* (2013.01); *G06F 17/30153* (2013.01)

(58) Field of Classification Search
CPC .......... H04W 28/06; H04L 69/04; H04N 9/00
See application file for complete search history.

(56) References Cited

U.S. PATENT DOCUMENTS

| | | |
|---|---|---|
| 6,085,069 A | 7/2000 | Sharpe |
| 7,023,974 B1 | 4/2006 | Brannam et al. |
| 2006/0009150 A1 | 1/2006 | Leung et al. |
| 2006/0129689 A1 | 6/2006 | Ho et al. |
| 2006/0221959 A1 | 10/2006 | Sumiyoshi |

(Continued)

FOREIGN PATENT DOCUMENTS

WO 2012068300 5/2012

OTHER PUBLICATIONS

Extended European Search Report from co-pending PCT application No. PCT/US11/61063 dated Jul. 7, 2014.

(Continued)

*Primary Examiner* — Shaq Taha
(74) *Attorney, Agent, or Firm* — Baker & McKenzie LLP

(57) ABSTRACT

Disclosed are systems and methods for providing message compression instructions by communicating with a plurality of sender machines and a plurality of receiver machines and monitoring one or more messages from the plurality of sender machines. The disclosed systems and methods may also identify a part of the one or more messages that is frequently included in a plurality of the messages sent by the plurality of sender machines, dynamically determine compression instructions to compress this part of the message, and provide the compression instructions to at least one of the plurality of sender machines, such that the compression instructions reduce size of the messages having the part of the message associated with the compression instructions.

18 Claims, 3 Drawing Sheets

(56) References Cited

U.S. PATENT DOCUMENTS

| | | |
|---|---|---|
| 2007/0005807 A1 | 1/2007 | Wong |
| 2007/0043866 A1 | 2/2007 | Garbow et al. |
| 2008/0016246 A1 | 1/2008 | Singh |
| 2008/0025298 A1* | 1/2008 | Lev-Ran ............... H04L 69/04 370/389 |
| 2008/0080559 A1* | 4/2008 | Singh .................. H04W 28/04 370/477 |
| 2008/0298459 A1* | 12/2008 | Yang ..................... H03M 7/30 375/240 |
| 2009/0207854 A1* | 8/2009 | Blanchard ............ H04L 69/04 370/466 |
| 2010/0011125 A1 | 1/2010 | Yang et al. |
| 2010/0115137 A1 | 5/2010 | Kim et al. |
| 2010/0254378 A1 | 10/2010 | Akella et al. |
| 2014/0321764 A1* | 10/2014 | Zarom ................. H04N 19/593 382/243 |

OTHER PUBLICATIONS

International Search Report and Written Opinion of the International Searching Authority for co-pending PCT application No. PCT/US2011/061063 mailed Jun. 29, 2012.

* cited by examiner

COMPRESSION OF MESSAGE INFORMATION TRANSMITTED OVER A NETWORK

CROSS REFERENCE TO RELATED APPLICATIONS

This is a continuation application of and claims priority to U.S. patent application Ser. No. 13/298,234, filed Nov. 16, 2011 entitled "Compression of message information transmitted over a network" by Selph that is a non-provisional of and claims priority to U.S. Provisional Patent Application No. 61/414,321, filed Nov. 16, 2010 entitled "Server assisted adaptive metadata compression" by Selph, both of which are hereby incorporated by reference in their entirety.

TECHNICAL FIELD

The disclosed embodiments relate generally to compression of message information and, more specifically, systems and methods for managing transmission of compressed forms of information.

BACKGROUND

Typical servers and communication systems do not provide efficient implementations to limit the size of transmissions, which may cause the network to become congested. Typically, all of the information of a transmission is necessarily passed through the network. Without data compression, expensive resources are continuously consumed with every message, including storage space and transmission bandwidth. This problem may become worse when the communication systems utilize a message format in the message itself to create a self-describing message that may allow senders and receivers to communicate with one another without any prearrangement. Self-describing messages having message format information adds overhead to every message, which, in network communication, consumes expensive resources and negatively affects communication speed. The need has arisen to provide a method and system for transmitting self-describing messages that addresses the issues of consuming expensive resources, communication speed, and network congestion.

SUMMARY

According to an aspect of this disclosure, systems are described for compressing information communicated in message-oriented middleware systems. The systems includes a sender machine and a receiver machine for sending and receiving compressed information across a network. A facilitator server is operable to facilitate compressing of the information. In an embodiment, the facilitator server is operable to monitor traffic and/or content of the network or data pipeline and to facilitate compressing of the information based on results of the monitoring.

According to another aspect of this disclosure, methods are described for compressing information communicated in message-oriented middleware systems. The methods may include compressing information and sending a compressed form of the information by a sender machine, and receiving and uncompressing the compressed form of information by a receiver machine. The compressed information may include a compression identifier. The methods may further include the receiver machine uncompressing the compressed form of information based on the compression identifier received from the sender machine and decompression instructions from a facilitator server. The methods may include monitoring traffic and content of a network and generating compression and decompression instructions and compression identifiers based on results of the monitoring.

DETAILED DESCRIPTION

Figure 1:
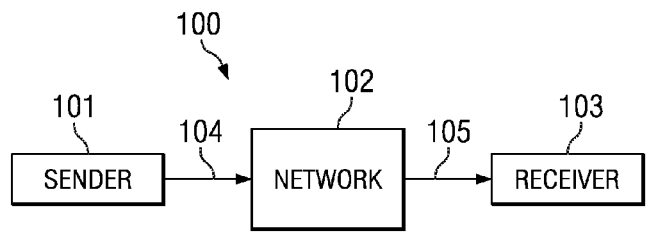
FIG. 1 is a schematic diagram of an example communication system, in accordance with the present disclosure.

FIG. 1 is a schematic diagram of an example communication system 100. The system 100 includes a sending machine 101 for sending a message over a network 102 to a receiving machine 103. At the output of the sending machine 101, a certain amount of information 104 may be outputted from the machine, and at the input of the receiving machine 103, a certain amount of information 105 may be received. If sending machine 101 wishes to send more information 104/105 to the receiving machine 103, all of that information 104/105 is necessarily passed through network 102. Without data compression, expensive resources are continuously consumed with every message, including storage space and transmission bandwidth.

In conventional solutions, message-oriented middleware systems may be utilized to facilitate the transmission of content messages having a particular format (e.g., a self describing message). Machines sending and receiving structured or semi-structured data of various types (text strings, numeric data, floating-point numeric data, date/time, etc.) via message-oriented middleware systems may need to know the format of the messages they exchange. The machine sending the message may encode its data into a message buffer for transmission and that encoding is known to the machine receiving the message so that the transmitted message buffer can be correctly parsed. An agreement of the format between the sender and receiver machines may be accomplished explicitly—by previous agreement as to the message formats between the senders and receivers—or the message format may be included as information in the message itself.

Including the message format in the message itself creates a self-describing message. A machine receiving the information may parse the message using the message format information contained within the message itself. Thus, the self-describing message, including the message format information, may allow senders and receivers to communicate without any prearranged format.

Disclosed herein are methods and systems for compressing messages and communicating the compressed messages. For example, method and systems may compress messages containing repetitive format and/or repetitive data, which will result in less traffic being communicated over a network. In an embodiment, message-based middleware systems on a network or data pipeline may enable format identifier information and/or format information and/or the compression and decompression of information at a sender machine and a receiver machine.

Figure 2:
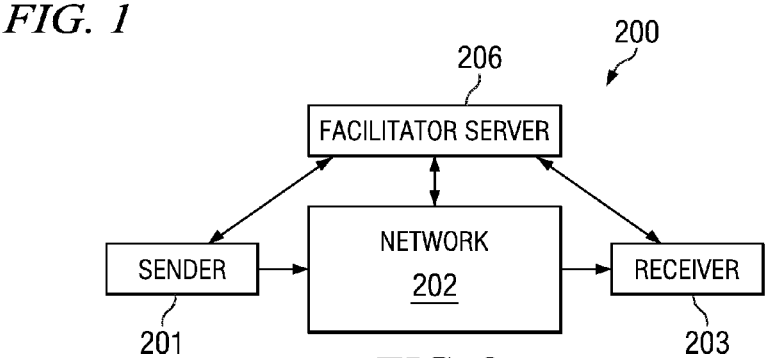
FIG. 2 is a schematic diagram of an example sender and receiver system, in accordance with the present disclosure.

FIG. 2 is a schematic diagram of an example sender and receiver system 200. The system 200 includes a facilitator server 206 capable of communicating with a sender machine 201 and a receiver machine 203. In an embodiment, the sender 201 and/or receiver 203 may communicate with facilitator server 206 through the network 202. Facilitator server 206 may report or determine a format, including which information is to be compressed, which allows sender machine 201 to send a compressed message over network 202. The compressed message allows for certain formatting information and/or data information to be omitted. Thus, the amount of information being transmitted over the network 202 is reduced.

Figure 3:
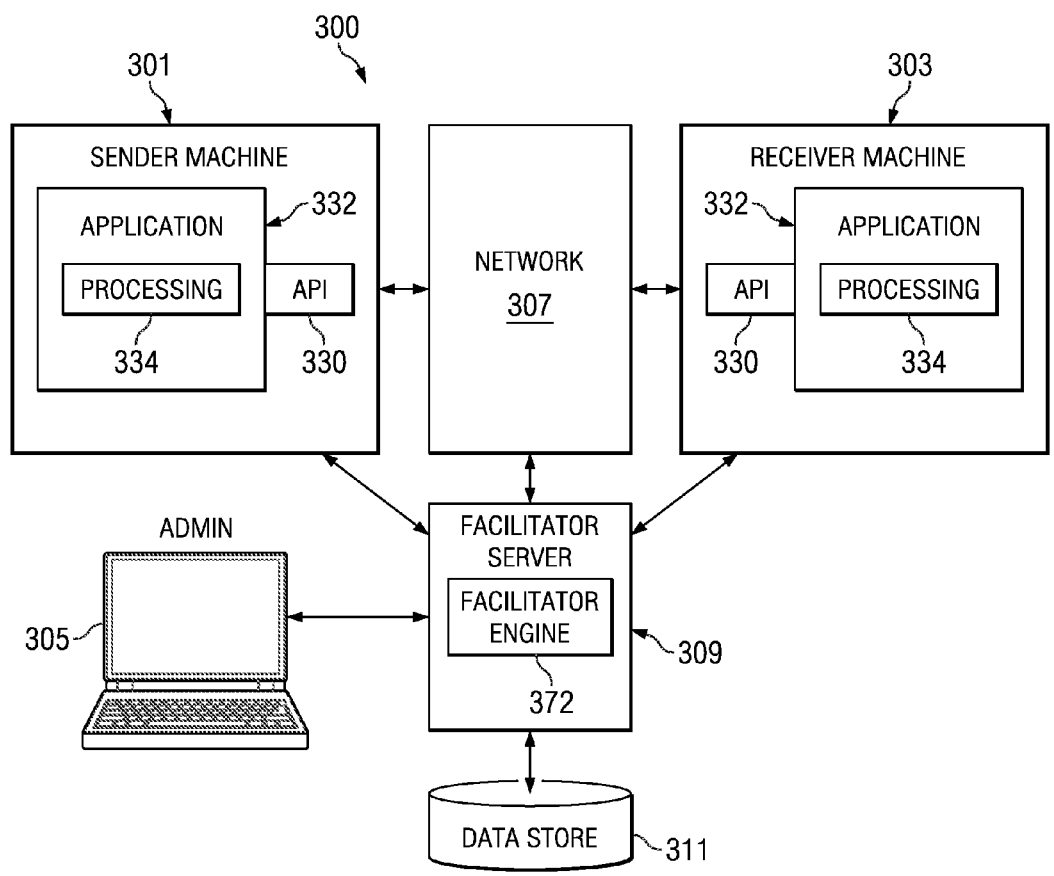
FIG. 3 is a schematic diagram of an example system for compressing messages, in accordance with the present disclosure.

FIG. 3 is a schematic diagram of an example system for compressing messages. The system 300 may include a sender machine 301, a receiver machine 303 and a facilitator server 309 on a network 307. The system 300 may further include a data store 311 and an administrator machine 305. Sender machine 301 and receiver machine 303 may each include an API 330 for interfacing with an application 332 and a processing engine 334 for running the application 332. Facilitator server 309 may include a facilitator engine 372. Facilitator engine 372 may be any processor component, or the like, for processing information and/or facilitating compression of information, including generating a compression identifier for use in compressed information communications between sender machine 301 and receiver machine 303. In an example embodiment, the compression identifier is used to identify the compressed information. In an example embodiment, the facilitator server 309 generates a compression identifier for each type of message to be compressed. In some embodiments, the compression identifier may be generated upon identifying the information to be compressed. In some embodiments, the compression identifier may be generated when sender machine 301 is ready to send information to be compressed.

Network 307 may represent any form of communication network supporting circuit-switched, packet-based, and/or any other suitable type of communications between the sender machine 301, receiver machine 303, and facilitator server 309, and any other elements in FIG. 1. In an embodiment, the facilitator server 309 may also be in communication with an administrator machine 305, allowing an administrator to alter settings of the facilitator server 309 and to add compression instructions and information to be compressed into a compression library (not shown) stored in, for example, the data store 311, which is accessible by the facilitator server 309. Network 307 may additionally include any other nodes of system 300 capable of transmitting and/or receiving information over a communication network. Although shown in FIG. 1 as a single element, network 307 may represent one or more separate networks (including all or parts of various different networks) that are separated and serve different respective elements illustrated in FIG. 1. Network 307 may include routers, hubs, switches, firewalls, content switches, gateways, call controllers, and/or any other suitable components in any suitable form or arrangement. Network 307 may include, in whole or in part, one or more secured and/or encrypted Virtual Private Networks (VPNs) operable to couple one or more network elements together by operating or communicating over elements of a public or external communication network. In general, network 307 may comprise any combination of public or private communication equipment such as elements of the public switched telephone network (PSTN), a global computer network such as the Internet, a local area network (LAN), a wide area network (WAN), or other appropriate communication equipment. In some embodiments, network 307 may not be used if all of the components are located on the same machine. In an embodiment, sender machine 301 and receiver machine 303 may communicate through peer-to-peer (P2P) communications over network 307.

Facilitator server 309 may facilitate communication of information (e.g., metadata and/or data associated with messages) in compressed form, which may include omitting a part or all formatting information of the message and/or data from the message itself. This provides performance improvements, particularly over time when several messages of the same format and/or containing the same information are communicated. The facilitator server 309 may record (e.g., in the compression library) and determine (e.g., by referencing the compression library or monitoring traffic and/or content of the network) information to be compressed, such as message formats or data, generate associated compression identifiers, and may send them on demand to a sender machine 301, a receiver machine 303 and/or both. Applications running on the sender machine 301 and/or receiver machine 303 may cache the information to be compressed/uncompressed and/or compression identifiers, allowing the machines to communicate with each other without including the repetitive information in the message and/or without repetitive contact with the facilitator server 309.

The facilitator server 309 may also monitor traffic and/or content in the network. In an example embodiment, results of the monitoring may be used to create compression/decompression instructions and/or compression identifiers on-the-fly, and in particular is operable to optimize compression techniques in high traffic conditions and/or for message formats and/or contents occurring frequently in a given time window.

System 300 may comprise sender machine 301, receiver machine 303, and facilitator server 309, each of which may be any suitable computing device comprising a processor and a memory to perform the described functionality. Sender machine 301, receiver machine 303, and facilitator server 309 may comprise one or more machines, workstations, laptops, blade servers, server farms, and/or stand-alone servers. Sender machine 301, receiver machine 303, and facilitator server 309 may include any hardware and/or controlling logic used to communicate information to and from one or more elements illustrated in FIG. 3. For example, sender machine 301, receiver machine 303, and facilitator server 309 may be operable to receive and process data of different types that may be transmitted via different protocols or formats. Other elements in FIG. 3 may also comprise hardware and/or controlling logic to communicate information to and from one or more elements illustrated in FIG. 3.

While illustrated as a single sender machine 301 in FIG. 3, system 300 may comprise more than one sender machine 301. Although described as sender machine 301 in FIG. 3, sender machine 301 may receive messages in some embodiments. While illustrated as a single receiver machine 303 in FIG. 3, system 300 may comprise more than one receiver machine 303. Although described as receiver machine 303 in FIG. 3, receiver machine 303 may generate and send messages in some embodiments.

Memory may store any suitable information. Memory may comprise any collection and arrangement of volatile and/or non-volatile components suitable for storing data. For example, memory may comprise random access memory (RAM) devices, read only memory (ROM) devices, magnetic storage devices, optical storage devices, and/or any other suitable data storage devices. In particular embodiments, memory may represent, in part, computer-readable storage media on which computer instructions and/or logic are encoded. Memory may represent any number of memory components within, local to, and/or accessible by processor. Processor may represent and/or include any form of processing component, including general purpose computers, dedicated microprocessors, or other processing devices capable of processing electronic information. Examples of processor include digital signal processors (DSPs), application-specific integrated circuits (ASICs), field-programmable gate arrays (FPGAs), and any other suitable specific or general purpose processors.

Figure 4A:
FIG. 4A is a schematic diagram illustrating an example of a message buffer, in accordance with the present disclosure.
Figure 4B:
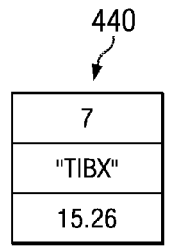
FIG. 4B is a schematic diagram illustrating an example of an optimized message buffer, in accordance with the present disclosure.
Figure 4C:
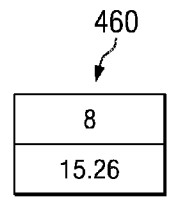
FIG. 4C is a schematic diagram illustrating another example of an optimized message buffer, in accordance with the present disclosure.

FIGS. 4A, 4B, 4C are schematic diagrams illustrating messages 420, 440, 460.

Message header 420 or message buffer 420 may be included as part of a message and is an exemplary way to self-describe the message. Message header 420 may include format information that a receiver machine may use to parse the message. For example, message header 420 includes a field name ("Ticker"), field type (1, e.g., for string), field value ("TIBX"), field name ("Value"), field type (2, e.g., for floating point number), and field value (15.26). As discussed above, such self-describing messages add overhead to every message, thereby consuming resources and decreasing effective communication speed for a given bandwidth communication channel. In some embodiments, message header 420 may include the entire message.

Message header 440 is an example of a compressed form of the example of FIG. 4A. The optimized message header 440 may include a compression identifier (7) for a unique message format and field values ("TIBX" and 15.26). In the example, the message header 440 may be pre-pended with the message's compression identifier (e.g., 7), which allows for the field names and types to be omitted.

Message header 460 is another example of a compressed form of the example of FIG. 4A. In many cases, a series of messages may be sent in which one or more of the fields have a fixed value (e.g., for a series of stock quote messages sent for the same equity instrument would have the ticker symbol of the equity field with a fixed value). If the value of the field is long, additional data compression may be realized by compressing the fixed data field rather than including it in individual messages. In the example given above for FIGS. 4A and 4B, if messages include the field name "Ticker" having a constant value of "TIBX," then an optimized message format may include only a compression identifier (e.g., 8) and any other message fields (e.g., 15.26) that are not compressed. The message 460 is pre-pended with the message's compression identifier (e.g., 8, which differs from the compression for FIG. 4B in which the Ticker field is variable). Field names, types, and constant-value fields may, thus, be eliminated from the message payload. In other words, the values of the constant values may be compressed by, for example, replacing them with a compression identifier (both stored at the facilitator server) rather than containing them in the message itself.

Referring back to FIG. 3, in an embodiment, facilitator server 309 library of compression information/instructions (e.g., message formats) and associated compression identifiers may be built manually through an administrative machine 305. In some embodiments, the facilitator server 309 library of compression information/instructions (e.g., message formats) and compression identifiers may be recorded and/or built dynamically as senders create new messages or as receivers receive messages. In some embodiments, facilitator server can be automated to dynamically generate compression information/instructions (e.g., message formats) and compression identifiers based on the messages transmitted from sender machine to receiver machine, such that administrator is not needed. In cases where a message that has a new format or is not stored in the library is sent before the facilitator server completes the dynamic record/registration, the system may temporarily and/or automatically degrade to fully self-describing messages.

Figure 5:
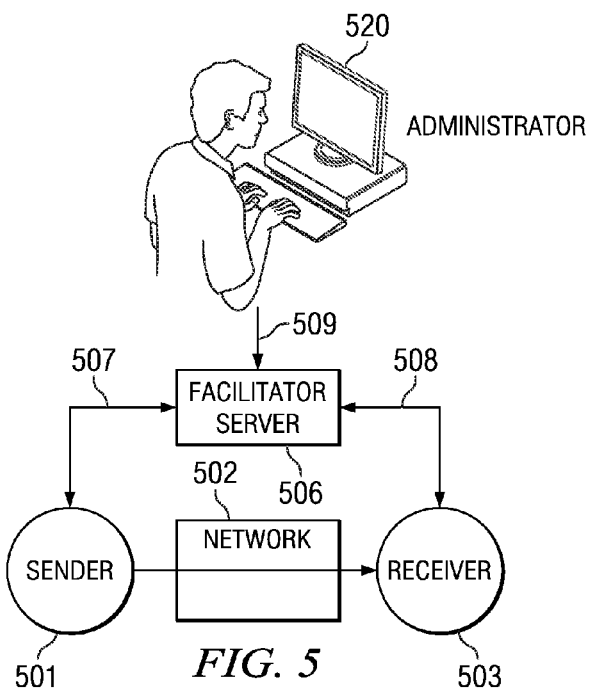
FIG. 5 is a schematic diagram of a sender and receiver system, in accordance with the present disclosure.

As discussed above in relation to FIG. 3, in an embodiment, information to be compressed may be identified manually by an administrator or automatically by facilitator server 309 based on the messages transmitted from sender machine 301 to receiver machine 303. FIG. 5 is a schematic diagram illustrating a system 500 for sending and receiving messages having manual interaction between an administrator 520, facilitator server 506, sender 501, and receiver 503. At a high level, the administrator 520 may manually identify and provide information to be compressed (path 509) to the facilitator server 506. In some embodiments, administrator 520 may also determine the associated compression identifier for the identified information to be compressed. In some embodiments, facilitator server 506 may automatically determine the associated compression identifier for the identified information to be compressed. In an example embodiment, facilitator server 506 may continuously and/or periodically monitor traffic and/or content in the network 502 so as to identify and further optimize the information to be compressed. In further optimizing the information to be compressed, the facilitator server 506 may further compress or completely replace the manually identified information to be compressed based on the results of the monitoring. The sender 501 may request instructions from facilitator server 506 pertaining to the information to be compressed and the associated compression identifier. In some embodiments, sender machine 501 may promptly cache the compression identifier and associated uncompressed information for future use, which generates further efficiency gains. The sender 501 may proceed to compress a message according to the instructions from the facilitator server 506 and send a compressed form of the message to the receiver 503. The receiver 503 receives the compressed message, which may include the compression identifier, and requests decompression instructions pertaining to the compressed message from the facilitator server 506. In some embodiments, receiver machine 503 may promptly cache the compression identifier and associated uncompressed information for future use when receiving the same compressed messages. Once cached, receiver machine 503 may no longer need to send a request to facilitator server 506 to decompress the same compressed message.

Figure 6:
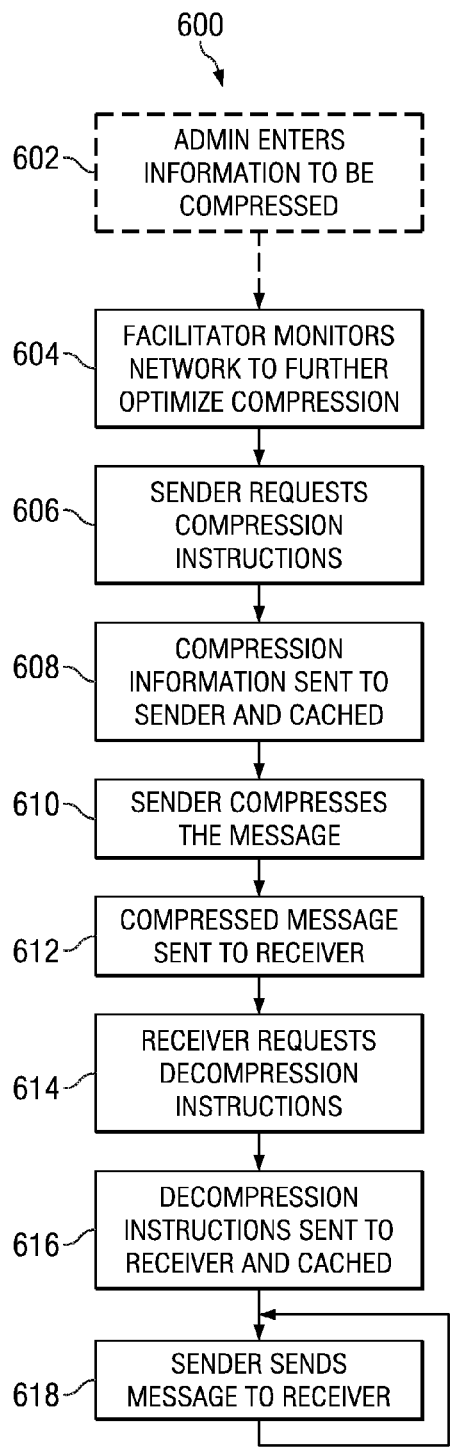
FIG. 6 is a flow diagram illustrating sending and receiving compressed messages, in accordance with the present disclosure.

FIG. 6 is a flow diagram illustrating an example process 600 of FIG. 5. Optionally, the administrator may determine information to be compressed and communicate it to the facilitator server at action 602. The administrator may also determine the associated compression identifier, or such may be the task of the facilitator server. At action 604, the facilitator server may then monitor the traffic and/or contents of the network so as to further optimize compression of information. At action 606, a sender requests compression instructions or format information (if it has not already cached the compression instructions and associated compression identifier), including the associated compression identifier, from a facilitator server. At action 608, the facilitator server sends the compression instructions or format information to the sender. At action 610, the sender compresses the message based on the instructions from the facilitator machine. At action 612, the compressed (or formatted) message includes the compression identifier. At action 614, the compressed (or formatted) message is sent to the receiver. Upon receiving the compressed message, the receiver requests decompression instructions or format instructions (if it has not already cached the decompression instructions and associated compression identifier) for the specified compression identifier from the facilitator server. At action 616, the decompression instructions or format instructions are sent to the receiver machine, and the receiver machine may cache these instructions. At action 618, sender may continue to send messages to the receiver and the receiver may decompress the same compressed message based on the cached information, without interacting with the facilitator server.

Figure 7:
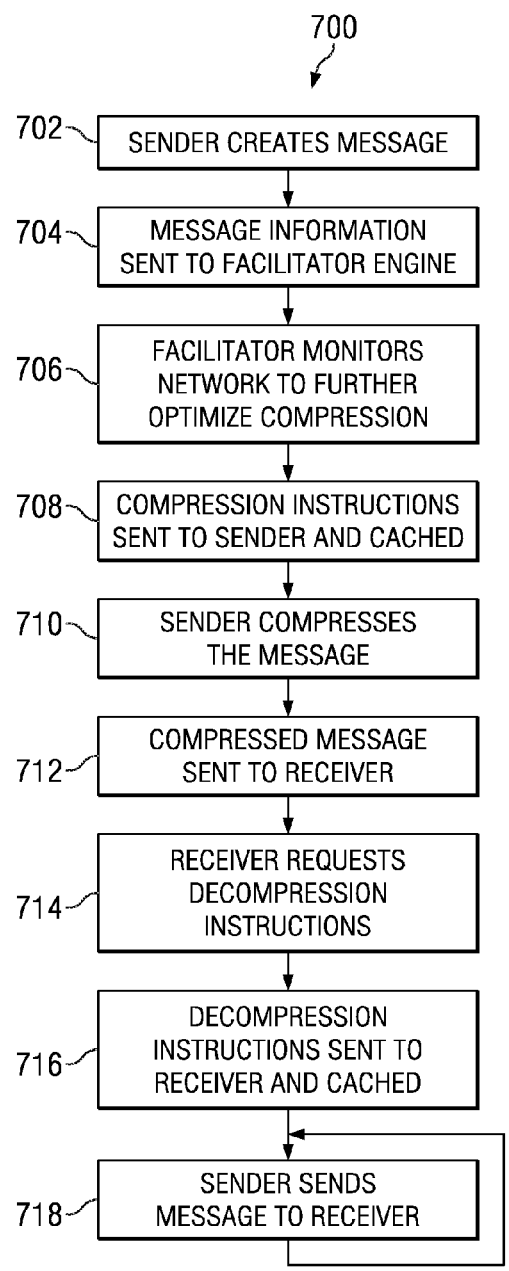
FIG. 7 is a flow diagram illustrating sending and receiving compressed messages, in accordance with the present disclosure.

FIG. 7 is a flow diagram illustrating a process for dynamic interaction between a facilitator server, sender, and receiver. At action 702, the sender creates a new message. In an embodiment, the created message is a new message which may not be known to the facilitator server, and the new message may include new format information and/or new data. At action 704, the message information or message format is sent to the facilitator server, and, if the format or contents of the message are new, the facilitator server will register the new format or content in the compression library. At action 706, the facilitator server may then monitor the traffic and/or contents of the network so as to further optimize compression of information transmitted between senders and receivers. At action 708, the facilitator server sends compression instructions pertaining to the new content or format, along with an associated compression identifier, to the sender. In an example embodiment, the compression instructions or format instructions and associated compression identifier are cached by the sender. At action 710, if the sender receives the compression instructions or format instructions before sending the new message, the sender compresses the message, including the compression identifier, according to compression instructions or format instructions and sends the compressed message to the receiver at action 712. At action 714, upon receiving the compressed message, the receiver requests decompression instructions from the facilitator server based on the received compression identifier. At action 716, The facilitator server sends the decompression instructions or format instructions to the receiver, and the receiver caches this information. At action 718, the sender may continue to send similar messages having a similar or same format to the receiver and the receiver may uncompress based on the cached information. It is to be understood that if the sender does not receive the compression instructions before sending the new message, the new message may be sent as an uncompressed self-describing message. Future communication of the same message may be compressed and uncompressed using the compression/decompression instructions in the manner described above.

Figure 8:
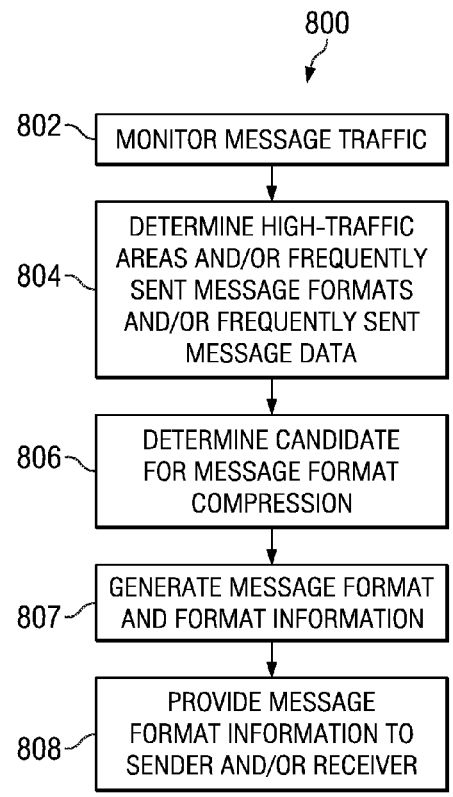
FIG. 8 is flow diagram illustrating monitoring and compression of messages, in accordance with the present disclosure.

FIG. 8 is a flow diagram illustrating a process 800 for dynamic or adaptive interaction between the facilitator server, a sender, and a receiver. The facilitator server monitors message traffic and/or content over a network at action 802. The facilitator server may determine one or more high traffic areas in the network at action 804. Alternatively or in addition, the facilitator server may identify frequently sent messages having the same format at action 804 which may be good candidates for message format compression at action 806. Alternatively or in addition, the facilitator server may determine frequently sent data at action 804 which may be good candidates for message data compression at action 806. The facilitator server may dynamically determine information to be compressed (including instructions to compress and uncompress) and generate compression identifiers for such message format types and/or for such message data at action 807. The facilitator server may provide the compression/decompression instructions, including the compression identifier, to a sender machine and/or a receiving machine in a similar manner as discussed above at action 808.

In the case of FIGS. 6 to 8, messages are sent without repetitive information being included in the message itself, and message compression improves over time as senders create and share more messages. In this regard, substantially less consumption of resources are realized.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, a part of a machine, or machine in a networked computing environment. Also as referred to herein, a networked computing environment is a collection of machines connected by communication channels that facilitate communications between machines and allow for machines to share resources. Network may also refer to a communication medium between processes or machine parts on the same machine. Also as referred to herein, a server is a machine deployed to execute a program operating as a machine using the network and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, other non-hardware resources, and bandwidth, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

The coverage of the present application and any patents issuing there from may extend to local-area network, wide-area network, or other network operating using other communications protocols, including communication between processes on the same machine.

Services and applications are described in this application using those alternative terms. Services can be java services or other instances of operating code. A service/application is a program running on a machine or a cluster of machines in a networked computing environment. Services may be transportable and may be run on multiple machines and/or migrated from one machine to another.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A facilitator server operable to:
receive compression instructions from an administrator machine, wherein the compression instructions allow at least one of a plurality of sender machines to create a compressed message by replacing message data with a compressed form of the message data and allow at least one of a plurality of receiver machines to decompress the compressed message;
monitor traffic or content transmitted over a network to identify information frequently transmitted over the network as candidates for use in further optimizing the compression instructions;
adjust the compression instructions based on at least one of the candidates identified in the monitored traffic or content to further compress the compressed message; and
provide the adjusted compression instructions to the at least one of the plurality of sender machines and to the at least one of the plurality of receiver machines, wherein the at least one of the sender machines can compress at least a part of the message data by replacing the part of the message data with the compressed form of the message data according to the adjusted compression instructions, and wherein the compressed message comprises a compression identifier.

2. The facilitator server of claim 1, wherein the facilitator server is further operable to send a compression identifier associated with the compression instructions to the at least one of the plurality of sender machines.

3. The facilitator server of claim 1, wherein the sender machine can compress at least a second part of the message data by replacing the second part of the message data with the compressed form of the message data according to the compression instructions.

4. The facilitator server of claim 1, wherein the compressed message comprises format information and data contents, wherein the compression instructions may compress a part of the format information or the data contents.

5. The facilitator server of claim 1, wherein the at least one of the plurality of receiver machines that receives the compression instructions can store the compression instructions for future message compression of messages sent or received by the at least one of the plurality of receiver machines without having to communicate further with the facilitator server.

6. The facilitator server of claim 1, wherein the at least one of the plurality of receiver machines that receives the adjusted compression instructions can store the adjusted compression instructions for future message compression of messages sent or received by the at least one of the plurality of receiver machines without having to communicate further with the facilitator server.

7. The facilitator server of claim 1, wherein the at least one of the plurality of sender machines requests the adjusted compression instructions.

8. The facilitator server of claim 1, wherein the at least one of the plurality of receiver machines requests the adjusted compression instructions.

9. The facilitator server of claim 1, wherein the adjusted compression instructions get cached once received by one of the plurality of sender machines and/or the at least one of the plurality of receiver machines.

10. A method for providing message compression instructions, wherein the method comprises:
receiving, by a facilitator server, compression instructions from an administrator machine, wherein the compression instructions allow at least one of a plurality of sender machines to create a compressed message by replacing message data with a compressed form of the message data and allow at least one of a plurality of receiver machines to decompress the compressed message;

monitoring, by the facilitator server, traffic or content transmitted over a network to identify information frequently transmitted over the network as candidates for use in further optimizing the compression instructions;

adjusting, by the facilitator server, the compression instructions based on at least one of the candidates identified the monitored traffic or content to further compress the compressed message; and providing, by the facilitator server, the adjusted compression instructions to the at least one of the plurality of sender machines and to the at least one of the plurality of receiver machines, wherein the at least one of the sender machines can compress at least a part of the message data by replacing the part of the message data with the compressed form of the message data according to the adjusted compression instructions, and wherein the compressed message comprises a compression identifier.

11. The method of claim 10, wherein the facilitator server is further operable to send a compression identifier associated with the compression instructions to the at least one of the plurality of sender machines.

12. The method of claim 10, wherein the at least one of the sender machines can compress at least a second part of the message data by replacing the second part of the message data with the compressed form of the message data according to the compression instructions.

13. The method of claim 10, wherein the compressed message comprises format information and data contents, wherein the compression instructions may compress a part of the format information or the data contents.

14. The method of claim 10, wherein the at least one of the plurality of receiver machines that receives the compression instructions can store the compression instructions for future message compression of messages sent or received by the at least one of the plurality of receiver machines without having to communicate further with the facilitator server.

15. The method of claim 10, wherein the at least one of the plurality of receiver machines that receives the adjusted compression instructions can store the adjusted compression instructions for future message compression of messages sent or received by the at least one of the plurality of receiver machines without having to communicate further with the facilitator server.

16. The method of claim 10, wherein the at least one of the plurality of sender machines requests the adjusted compression instructions.

17. The method of claim 10, wherein the at least one of the plurality of receiver machines requests the adjusted compression instructions.

18. The method of claim 10, wherein the adjusted compression instructions get cached once received by one of the plurality of sender machines and/or the at least one of the plurality of receiver machines.

* * * * *